Patented July 2, 1935

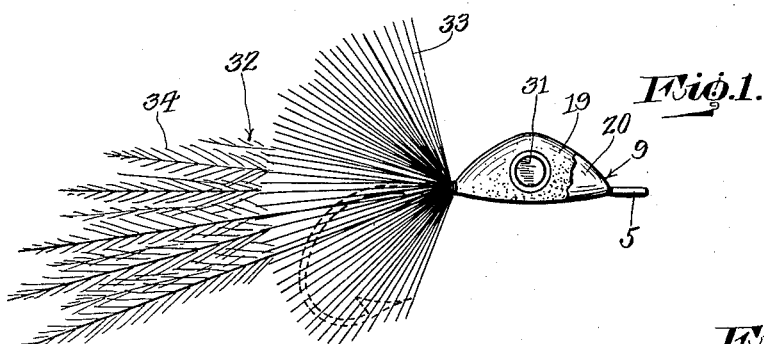
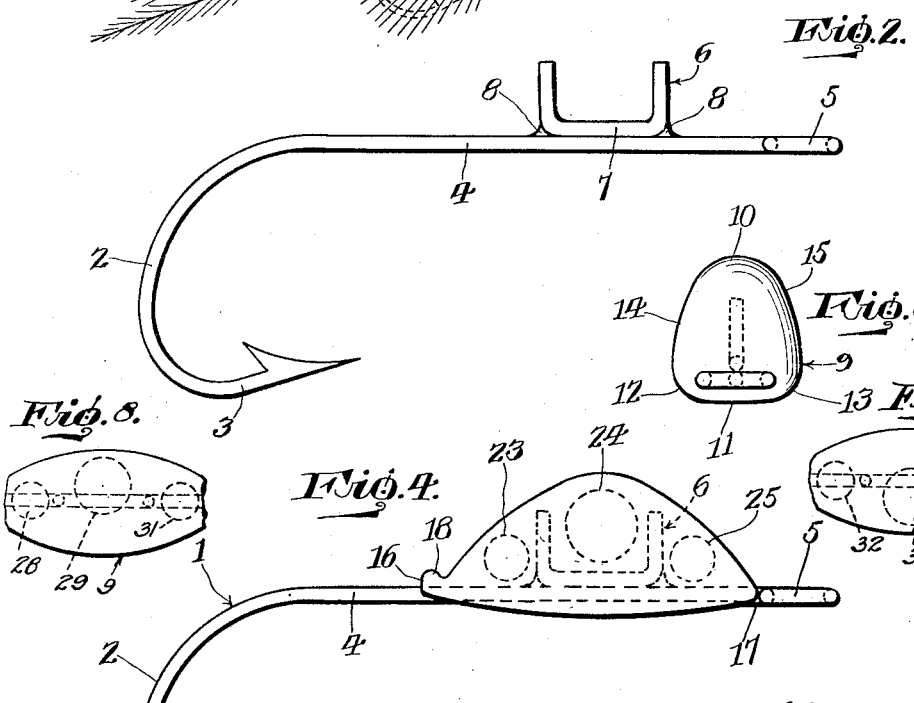
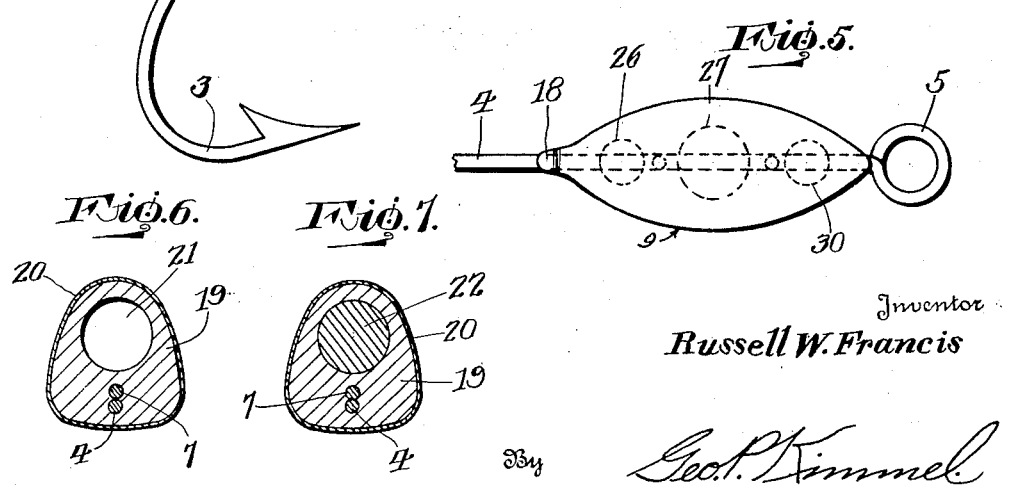

2,007,045

UNITED STATES PATENT OFFICE 2,007,045

ARTIFICIAL FISH LURE

Russell W. Francis, Pittsburg, Kans.

Application March 3, 1933, Serial No. 659,553

17 Claims. (Cl. 43—48)

My invention relates to an artificial fish lure.

The essential objects of my invention are to provide, in a manner as hereinafter set forth, an artificial fish lure so constructed and arranged whereby the retrieving of the lure from the water is had with a minimum of friction and the casting thereof through the air is carried out with a minimum of friction and to a maximum distance with a minimum expenditure of effort.

A further object of my invention is to provide, in a manner as hereinafter set forth, an artificial fish lure of stream-line shape and including a head provided with eyes disposed in a plane with the side surfaces of the head, that is the eyes, do not extend, bulge or stick out from the surrounding plane thereby preventing the generation of friction, by the eyes when the lure is drawn through the water or when cast through the air.

A further object of my invention is to provide, in a manner as hereinafter set forth, an artificial fish lure of stream-line shape including a head and a ruff having its forward part attached to and built upon the back portion of the head whereby the desired stream-line is more nearly effected, and which tends to lessen friction when the lure is drawn through the water or is cast through the air.

A further object of my invention is to provide, in a manner as hereinafter set forth, an artificial fish lure of positive stream-line shape patterned after a wild duck's head including a hook, head and ruff, the latter consisting of feathers and hair extending forwardly and anchored at their forward ends in the back part of the head, and with such arrangement providing an unusually balanced lure that may be cast on the lightest fly rods with a minimum of strain on the rod, as well as a lure easy to cast and easy to retrieve when built in larger sizes for bait casting purposes.

A further object of my invention is to provide, in a manner as hereinafter set forth, an artificial bait lure having a head so shaped, that the lure when in motion in the water closely imitates the life-like actions of a live minnow whether the lure rides with the hook down, with the hook up or with the hook on either side.

A further object of my invention is to provide, in a manner as hereinafter set forth, an artificial fish lure including a head formed from a solidified plastic substance of greater durability than cork that will withstand a maximum amount of wear, tear and abuse.

A further object of my invention is to provide, in a manner as hereinafter set forth, an artificial fish lure of stream-line shape and including a head formed of a plastic material having a slightly greater specific gravity than cork, slightly less than that of pine and much less than that of lead.

A further object of my invention is to provide, in a manner as hereinafter set forth, an artificial fish lure of stream-line shape and including a head of a solidifiable plastic material and a ruff of feathers and hair, and with the forward end of the ruff embedded in the back part of the head, whereby on the solidifying of the material the ruff will be anchored to the head.

A further object of my invention is to provide, in a manner as hereinafter set forth, an artificial fish lure including a head formed of a material capable of being provided with one or more air chambers or capable of having embedded therein one or more weights.

A further object of my invention is to provide, in a manner as hereinafter set forth, an artificial fish lure including a hook and a head encompassing the shank thereof, the latter being provided with means to prevent relative movement in any direction of the head relative to the shank or vice-versa.

A further object of my invention is to provide, in a manner as hereinafter set forth, an artificial fish lure of stream-line shape including a head formed of a plastic body provided throughout with an elastic water-proofing coating therefor.

A further object of my invention is to provide, in a manner as hereinafter set forth, an artificial fish lure including a head, a hook having a part of its shank extended through the latter, and means integral with the shank and embedded within the head to prevent the slipping of the latter relative to the shank.

A further object of my invention is to provide, in a manner as hereinafter set forth, an artificial fish lure including a hook carrying a non-slip device and a head molded about the shank of the hook and around the non-slip device.

A further object of my invention is to provide, in a manner as hereinafter set forth, an artificial fish lure including a head capable of being formed at various points thereof with one or more air chambers or capable of having embedded therein at various points thereof one or more weights for controlling its riding position on the line.

A further object of my invention is to provide, in a manner as hereinafter set forth, an artificial fish lure including a hook and a head encompassing a part of the shank of the hook, and with the head capable of being formed with one or more air chambers concentric with or angularly disposed to the shank and further capable of having embedded therein one or more weights concentric with or angularly disposed to the shank for controlling the riding position of the lure.

Further objects of my invention are to provide, in a manner as hereinafter set forth, an artificial fish lure which is simple in its construction and arrangement, strong, durable, compact, thoroughly efficient when used and comparatively inexpensive to manufacture.

To the above ends essentially and to others which may hereinafter appear, my invention consists of such parts, and such combination of parts which fall within the scope of the invention as claimed.

In the drawing:

Figure 1 is a side elevation of the artificial fish lure.

Figure 2 is a side elevation of the hook.

Figure 3 is a view looking towards the inner end of the lure.

Figure 4 is a fragmentary view in side elevation of the lure showing in dotted lines one arrangement of air chambers or weights in the lure head.

Figure 5 is a fragmentary view in top plan of a modified form showing in dotted lines a different arrangement of the riding position controlling means in the lure head.

Figure 6 is a cross sectional view of the lure head provided with an air chamber.

Figure 7 is a cross sectional view of the lure head having embedded therein a weight.

Figures 8 and 9 are views similar to Figure 5 showing, in dotted lines, modified arrangements of the riding position controlling means in the lure head.

Referring to the drawing, the hook of the lure is generally indicated at 1 and it includes a hook part 2 having a bill 3, a shank 4 into which merges at its outer end the part 2 and an eye 5 integral with the inner end of shank 4. The hook part 2 is disposed at right angles to the eye 5. At a point between the transverse median of shank 4 and its inner end there is arranged a U-shaped member 6. The base 7 of the latter is welded to shank 4, as at 8. The member 6 is arranged on that side of shank 4 opposite the side which is opposed by the bill 3 of hook part 2. The member 6 is disposed in a plane at right angles to the plane of eye 5. The member 6 constitutes an anti-slip device for a purpose to be presently referred to.

The lure includes a head 9 gradually increasing in height from each end of its transverse center and has a rounded top 10, a smooth bottom 11, rounded lower corners 12, 13, sides 14, 15 inwardly curving from the corners 12, 13 to the top 10 and outwardly curving from the ends to the vertical medians thereof. The inner and outer ends of the head 9 are indicated at 16, 17 respectively. The outer end portion of head 9 is in the form of a tapered protuberance 18. The bottom 11 is outcurved from each end of the head 9 to the transverse median of the latter.

The head 9 is formed from a plastic body 19 and an elastic water-proof coating 20. The body 19 is molded about the shank 4 and has its inner end abut the eye 5. The outer end of body 19 is spaced rearwardly from the hook part 2. The body 19 has the major portion thereof extend from that side of the shank 4 provided with member 6. The body 19 completely embeds and extends laterally in opposite directions upwardly, forwardly and rearwardly from member 6. The latter is arranged centrally with respect to body 19 and acts as a means to prevent the movement of head 9 and shank 4 relatively to each other. That is to say member 6 provides an anti-slipping device for head 9. The material from which body 19 is made is of plastic wood. The water-proof coating is formed of a composition of film-scraps, ester gums, didutol phthalate and castor oil. It is to be understood that any suitable water-proofing substance for the purpose desired may be employed.

The head 9 may be provided with one or more air chambers 21 or one or more weights 22 to control the riding position of the line. The chambers or weights can be arranged in the manner as shown by dotted lines 23, 24, 25, Figure 4; as shown by dotted lines 26, 27 and 30, Figure 5; as shown in dotted lines 28, 29 and 31, Figure 8, and as shown in dotted lines 32, 33 and 34, Figure 9.

Each side, only one shown, of head 9 is provided with an eye 31 which does not protrude beyond the plane of coating 20.

The ruff is designated 32, and preferably the neck or hair part 33 thereof is anchored at its forward end in protuberance 18. The feathers or other part 34 of the ruff can either have their forward ends tied to the shank 4 or anchored in protuberance 18.

The material from which the body 19 of head 9 is formed is peculiarly suited for being molded and when molded congeals and solidifies into a compact substance that will withstand a maximum amount of wear, tear and abuse. The water-proofing coating 20 for body 19 is elastic, much more so than enamel and does not readily chip or crack when abused, and may be applied in any desired color or combination of colors.

The arranging of the elements of the lure in the manner as referred to provides a positive stream-line lure patterned after a wild duck's head thereby providing an unusually evenly balanced line that may be cast on the lightest fly rods with a minimum of strain on the rods, and further making the line equally effective and equally easy to cast and easy to retrieve irrespective of its size.

Because of the unique shape of the head of this lure, the lure when in motion in the water closely imitates the life-like actions of a live minnow whether the lure rides with the hook down, with the hook up, or with the hook on either side. It is claimed that the action of this lure is distinctly unlike that of any other lure.

Due to the unique shape of the head of this lure the lure can be retrieved from the water with a minimum expenditure of moving power.

The shape of this head will not be departed from whether the same is incorporated in an under water lure, a surface lure, or a semi-floating lure.

The lure, due to the distribution of weight and its stream-line shape is unique and has efficiencies in riding quality in or on the water.

The U-shaped member or non-slip device permits of an insertion of a weight, or weights or the formation of an air chamber or air chambers in the head.

Due to the employment of the U-shaped member it is possible to add or subtract from the buoyancy of the body without changing the size of the body or the shape of same.

The weights and air chambers, or any combination of both, can be molded into the head lure. The lure can either float on top of the water, or any desired distance under the surface, and by placing a weight farthest from the point of the hook, the lure can be inverted and will ride with the hook up, and when constructed with the air chambers the point will ride down.

The weights or air chambers can be molded directly into the head at any desired point not connected with the hook, to wit, in front of the U-shaped member, or between the legs of the U-shaped member, or behind the legs of the U-shaped member at the option of the maker.

Any number or combination of weights or air chambers can be used by the maker as is desired.

The lure may be so formed as to ride on a side thereof, and to provide for such position of the lure, the weight within the lure is positioned off center with respect to the plane of the hook. The legs of the U-shaped device are disposed in the plane of the hook and extend in an opposite direction with respect to the point of the hook.

Due to the fact that the head is molded directly upon the hook and over and around the non-slip device the desired finish material may be applied directly to the molded material without winding of any description or the application of any under coating material to make the finish adhere to the head.

What I claim is:—

1. In an artificial fish lure, a head gradually increasing in height from each end to its transverse center, said head having a stream-line rounded top, a smooth bottom uninterrupted throughout and of greater width than that of said top, rounded lower corners, sides curving inwardly from said corners to said top and outwardly curving from the ends to the vertical medians thereof, said bottom being outcurved from each side of the head to the transverse median of the latter, said head having its outer end portion in the form of a protuberance inclining upwardly from its inner end.

2. In an artificial fish lure, a stream-line head gradually increasing in height from each end to its transverse center, said head having a rounded top, a smooth bottom uninterrupted throughout and of greater width than said top, rounded lower corners, sides curving inwardly from said corners to said top and outwardly curving from the ends to the vertical medians thereof, said bottom being outcurved from each side of the head to the transverse median of the latter, said head having its outer end portion in the form of a protuberance, said head being formed throughout with an elastic water-proof coating and with eye simulating means surrounded by the plane of the coating.

3. In an artificial fish lure, a head of stream-line contour simulating the appearance of the head of a wild duck, a hook having a straight stretch of its shank extended through said head in close proximity to the lower face of the latter, the shank being extended forwardly and rearwardly from the head, said stretch being disposed throughout at the longitudinal median and below the longitudinal axis of said head, a U-shaped element having its base secured to the upper side of said stretch, each of the arms of said element being disposed between the vertical median of and an end of the head, said element being completely encased by the material of the head and preventing the shifting of the latter relatively to the shank, and means within the head and positioned adjacent to said element and stretch for controlling the riding position of the latter.

4. In an artificial fish lure, a head of stream-line contour simulating the appearance of the head of a wild duck, a hook having a straight stretch of its shank extended through said head in close proximity to the lower face of the latter, the shank being extended forwardly and rearwardly from the head, said stretch being disposed throughout at the longitudinal median and below the longitudinal axis of said head, a U-shaped element having its base secured to the upper side of said stretch, each of the arms of said element being disposed between the vertical median of and an end of the head, said element being completely encased by the material of the head and preventing the shifting of the latter relatively to the shank, means within the head and positioned adjacent to said element and stretch for controlling the riding position of the latter, said head being formed at its outer end with a protuberance, and a ruff having a neck part anchored within said protuberance.

5. In an artificial fish lure, a head of stream-line contour simulating the appearance of the head of a wild duck and having its outer end at its longitudinal median and below its longitudinal axis formed with a protuberance, a hook having a stretch of the shank thereof extended lengthwise of and through said head and positioned below said protuberance, and means secured to one side of and projecting from said stretch and snugly encased by the material of the head to prevent the shifting of the latter relative to the shank, and a ruff having a neck extending into and anchored in said protuberance.

6. In an artificial fish lure, a head of stream-line contour simulating the appearance of the head of a wild duck and having its outer end at its longitudinal median and below its longitudinal axis formed with a protuberance, a hook having a stretch of the shank thereof extended lengthwise of and through said head and positioned below said protuberance, means secured to one side of and projecting from said stretch and snugly encased by the material of the head to prevent the shifting of the latter relative to the shank, a ruff having a neck extending into and anchored in said protuberance, and said head having means completely arranged therein and spaced from the stretch and the said other means for controlling the riding position of the head.

7. In an artificial fish lure, a head of stream-line contour simulating the appearance of the head of a wild duck and having its outer end at its longitudinal median and below its longitudinal axis formed with a protuberance, a hook having a stretch of the shank thereof extended lengthwise of and through said head and positioned below said protuberance, means secured to one side of and projecting from said stretch and snugly encased by the material of the head to prevent the shifting of the latter relative to the shank, a ruff having a neck extending into and anchored in said protuberance, the said means being of U-shaped form, and said head having means completely arranged therein for controlling the riding position of the head and with such means located adjacent and spaced from the means of U-shape form and the stretch.

8. In an artificial fish lure, a head of stream-line contour, a hook including a shank, said shank having a stretch thereof extended through the head, the material of the head snugly encompassing said stretch, a holder element having a base seated on and anchored to one side of said stretch, said element being disposed at right angles to the plane of said stretch, said element being completely embedded in the head and preventing the shifting of the latter relative to the shank, and said head having means snugly encased thereby and spaced from said element and stretch for controlling the riding position of the latter.

9. In an artificial fish lure, a head of streamline contour, a hook including a shank, said shank having a stretch thereof extended through the head, the material of the head snugly encompassing said stretch, a holder element having a base seated on and anchored to one side of said stretch, said element being disposed at right angles to the plane of said stretch, said element being completely embedded in the head and preventing the shifting of the latter relative to the shank, said head having means snugly encased thereby and spaced from said element and stretch for controlling the riding position of the latter, said head having a protuberance at its outer end encompassing a portion of and extending above the shank, and a ruff having a neck anchored within said protuberance.

10. An artificial fish lure comprising a streamline head simulating the appearance of the head of a wild duck and formed of a body of plastic material completely enveloped by an elastic water proof covering, a hook including a shank, the latter having a stretch intermediate its ends positioned within the head lengthwise of the latter, laterally extending means on said stretch to prevent the revolving and lengthwise shifting of the hook relatively to the head, and means within said body and spaced from said stretch and the said other means to control the riding position of the head without changing the size of the latter.

11. An artificial fish lure comprising a streamline head simulating the appearance of the head of a wild duck and formed of a body of plastic material completely enveloped by an elastic water proof covering, a hook including a shank, the latter having a stretch intermediate its ends positioned within the head lengthwise of the latter, laterally extending means on said stretch to prevent the revolving and lengthwise shifting of the hook relatively to the head, and means within said body and spaced from said stretch and the said other means to control the riding position of the head without changing the size of the latter, said head at the bottom of its outer end being formed with an upwardly inclined protuberance, and a ruff including a neck, the latter being anchored within said protuberance.

12. An artificial fish-lure comprising a streamline head formed of a body of plastic material completely enveloped by an elastic water proof covering, a hook including a shank, the latter having a stretch thereof intermediate its ends positioned within the head lengthwise of the latter, a U-shaped member having its base integral with and lengthwise of a side of said stretch, said body being provided with means located in spaced relation with respect to the base and the forward and rear side of each arm of said member for controlling the riding position of the head without changing the size of said body.

13. An artificial fish-lure of the construction as set forth in claim 12 whereby said riding position controlling means consists of an inner weighting element and a pair of outer weighting elements, said inner element being arranged between and spaced from the said outer elements.

14. An artificial fish-lure of the construction as set forth in claim 12 whereby the said riding position controlling means consists of an inner air chamber and a pair of outer air chambers, said inner air chamber being arranged between and spaced from said outer air chambers.

15. An artificial fish-lure of the construction as set forth in claim 12 whereby the said riding position controlling means consists of an inner weighting element and a pair of outer weighting elements, the said inner element being arranged between and spaced from the said outer elements, the said outer and inner elements aligning with each other and being disposed at and extending above the longitudinal axis of said body, said elements being completely enveloped by the material forming said body.

16. An artificial fish-lure comprising a streamline head formed of a body of plastic material completely enveloped by elastic water proof covering, a hook including a shank, the latter having a stretch thereof intermediate its ends positioned within the head lengthwise of the latter, a U-shaped member having its base integral with and lengthwise of a side of said stretch, said body being provided with means located in spaced relation with respect to the base and the forward and rear side of each arm of said member for controlling the riding position of the head without changing the size of said body, and said stretch being located at the longitudinal median and below the longitudinal axis of said body.

17. An artificial fish-lure comprising a streamline head formed of a body of plastic material completely enveloped by an elastic water proof covering, a hook including a shank, the latter having a stretch thereof intermediate its ends positioned within the head lengthwise of the latter, a U-shaped member having its base integral with and lengthwise of a side of said stretch, said body being provided with means located in spaced relation with respect to the base and the forward and rear side of each arm of said member for controlling the riding position of the head without changing the size of said body, said body being formed at the bottom of its forward end with a forwardly directed protuberance aligning with its longitudinal median, and a ruff secured in and extended forwardly from said protuberance.

RUSSELL W. FRANCIS.